United States Patent
Medford et al.

(10) Patent No.: US 12,512,839 B2
(45) Date of Patent: Dec. 30, 2025

(54) SUPERCONDUCTING SERIAL-TO-PARALLEL CONVERTER SYSTEM

(71) Applicant: NORTHROP GRUMMAN SYSTEMS CORPORATION, Falls Church, VA (US)

(72) Inventors: James R. Medford, Columbia, MD (US); Kurt Pleim, Halethorpe, MD (US); Sean Ashley Lindsay, Millersville, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 46 days.

(21) Appl. No.: 18/509,071

(22) Filed: Nov. 14, 2023

(65) Prior Publication Data
US 2025/0158620 A1   May 15, 2025

(51) Int. Cl.
| | | |
|---|---|---|
| H03K 19/195 | (2006.01) | |
| G11C 11/44 | (2006.01) | |
| H03K 19/20 | (2006.01) | |
| H03M 9/00 | (2006.01) | |
| H10N 60/12 | (2023.01) | |

(52) U.S. Cl.
CPC .......... *H03K 19/195* (2013.01); *G11C 11/44* (2013.01); *H03K 19/20* (2013.01); *H03M 9/00* (2013.01); *H10N 60/12* (2023.02)

(58) Field of Classification Search
CPC ....... H03K 19/195; H03K 19/20; H03M 9/00; H10N 60/12; G11C 11/44

USPC ...... 326/3, 41; 333/245, 99 S, 236; 327/186; 257/31; 713/400
See application file for complete search history.

(56) References Cited

U.S. PATENT DOCUMENTS

| | | |
|---|---|---|
| 2008/0004876 A1 | 1/2008 | He et al. |
| 2009/0031975 A1 | 2/2009 | Rorig |
| 2009/0319757 A1* | 12/2009 | Berkley ................ G06N 10/80 257/31 |

(Continued)

FOREIGN PATENT DOCUMENTS

| | | |
|---|---|---|
| KR | 10-2020-0038546 A | 4/2020 |
| WO | 2022-263705 A1 | 12/2022 |

OTHER PUBLICATIONS

Woisr: "Notification of Transmittal of the International Search Report and the Written Opinion of the International Searching Authority, or the Declaration"; issued Nov. 17, 2025 for corresponding PCT/US2024/053433.

*Primary Examiner* — Arnold M Kinkead
(74) *Attorney, Agent, or Firm* — Tarolli, Sundheim, Covell & Tummino LLP (57) ABSTRACT

One example includes a superconducting serial-to-parallel converter system. The system includes a plurality of serial-input-parallel-output (SIPO) cells arranged in a sequence between a first SIPO cell and a last SIPO cell. Each of the SIPO cells is configured to convert a plurality of serial superconducting bits of a serial data stream into a set of parallel superconducting bits in response to an enable pulse. The enable pulse is provided through the sequence of SIPO cells from the first SIPO cell to the last SIPO cell based on the clock signal. The serial data stream is provided through the sequence of the SIPO cells from the last SIPO cell to the first SIPO cell based on a clock signal.

20 Claims, 7 Drawing Sheets

(56) References Cited

U.S. PATENT DOCUMENTS

2021/0021836 A1    1/2021   An et al.

* cited by examiner

SUPERCONDUCTING SERIAL-TO-PARALLEL CONVERTER SYSTEM

GOVERNMENT INTEREST

The invention was made under Government Contract. Therefore, the US Government has rights to the invention as specified in that contract.

TECHNICAL FIELD

The present invention relates generally to computer systems, and specifically to a superconducting serial-to-parallel converter system.

BACKGROUND

Superconducting digital technology has provided computing and/or communications resources that benefit from unprecedented high speed, low power dissipation, and low operating temperature. Superconducting digital technology has been developed as an alternative to CMOS technology, and typically comprises superconductor based single flux superconducting circuitry, utilizing superconducting Josephson junctions, and can exhibit typical signal power dissipation of less than 1 nW (nanowatt) per active device at a typical data rate of 20 Gb/s (gigabytes/second) or greater, and can operate at temperatures of around 4 Kelvin.

Superconducting circuits transfer data based on providing pulses on transmission lines (e.g., passive transmission lines (PTLs) or Josephson transmission lines (JTLs). Thus, data is typically provided in serial data streams along such transmission lines. To increase computational efficiency, computers provide data in parallel data bits on a bus. In superconducting computer systems, parallel pulses can be provided via an enable tree to enable all of the data to be transmitted simultaneously when a shift register is fully loaded with data. As the depth of the shift register increases, the enable tree grows exponentially. Given that reciprocal quantum logic (RQL) JTLs have a fanout of two, such exponential growth of an enable tree, such as for feeding the logical gate operations can result in physically large and potentially unfeasible circuits.

SUMMARY

One example includes a superconducting serial-to-parallel converter system. The system includes a plurality of serial-input-parallel-output (SIPO) cells arranged in a sequence between a first SIPO cell and a last SIPO cell. Each of the SIPO cells is configured to convert a plurality of serial superconducting bits of a serial data stream into a set of parallel superconducting bits in response to an enable pulse. The enable pulse is provided through the sequence of SIPO cells from the first SIPO cell to the last SIPO cell based on the clock signal. The serial data stream is provided through the sequence of the SIPO cells from the last SIPO cell to the first SIPO cell based on a clock signal.

Another example includes a method for converting superconducting pulses from a serial data stream to parallel data bits. The method includes providing an enable pulse to a last SIPO cell of serial sequence of the SIPO cells and providing a clock signal to the serial sequence of SIPO cells. The method also includes providing a serial data stream comprising a plurality of serial superconducting bits to a first SIPO cell of a serial sequence of SIPO cells, such that the serial data stream propagates from the last SIPO cell to the first SIPO cell and the enable pulse propagates from the first SIPO cell to the last SIPO cell. The method further includes providing a plurality of logic AND operations in each of the SIPO cells between the enable pulse and each of the serial superconducting bits to provide a set of parallel superconducting bits from each of the SIPO cells.

Another example includes a superconducting serial-to-parallel converter system. The system includes a plurality of SIPO cells arranged in a sequence between a first SIPO cell and a last SIPO cell. A serial data stream is provided through the sequence of the SIPO cells from the last SIPO cell to the first SIPO cell based on a clock signal and an enable pulse is provided through the sequence of SIPO cells from the first SIPO cell to the last SIPO cell based on the clock signal. Each of the SIPO cells includes a plurality of AND-gates configured to provide a logic AND operation between the enable pulse and each of a set of serial superconducting bits of the serial data stream to generate a corresponding set of parallel superconducting bits. Each of the SIPO cells also includes a serial data path comprising a set of serial data Josephson transmission lines (JTLs) configured to propagate the serial superconducting bits along the serial data path through the respective one of the SIPO cells based on the clock signal. Each of the SIPO cells also includes an enable path comprising a set of enable JTLs configured to propagate the enable pulse along the enable path through the respective one of the SIPO cells based on the clock signal in a direction opposite the propagation of the serial superconducting bits. Each of the SIPO cells further includes a second set of JTLs configured to delay at least one of the parallel superconducting bits relative to at least one other of the parallel superconducting bits, such that the set of parallel superconducting bits are provided from the respective one of the SIPO cells concurrently.

DETAILED DESCRIPTION

The present invention relates generally to computer systems, and specifically to a superconducting serial-to-parallel converter system. The superconducting serial-to-parallel converter system can be configured to convert a serial data stream of serial superconducting bits (e.g., single flux quantum (SFQ) pulses or reciprocal quantum logic (RQL) pulses) into parallel superconducting bits that correspond to the serial data stream. The superconducting serial-to-parallel converter system includes a plurality of serial-input-parallel-output (SIPO) cells that are arranged in a sequence between a first SIPO cell and a last SIPO cell. An enable pulse can be provided through the serial sequence of the SIPO cells from the first SIPO cell to the last SIPO cell, and the serial data stream can be provided through the serial sequence of the SIPO cells from the last SIPO cell to the first SIPO cell. Thus, the serial data stream and the enable pulse can counter propagate through the SIPO cells. Each of the SIPO cells can be configured to convert a set of the serial superconducting bits to a corresponding set of the parallel superconducting bits based on the enable pulse (e.g., through a logic AND operation) and in response to a clock signal.

As an example, each of the SIPO cells can include a serial data path and an enable path. The serial data path can include a set of serial data Josephson transmission lines (JTLs) configured to propagate the serial superconducting bits along the serial data path through the respective one of the SIPO cells based on the clock signal. The enable path can include a set of enable JTLs configured to propagate the enable pulse along the enable path through the respective one of the SIPO cells based on the clock signal in a direction opposite the propagation of the serial superconducting bits. The JTLs can be clocked at different phases of the clock signal (e.g., an RQL clock signal). Each of the SIPO cells can also include a plurality of AND-gates configured to provide a logic AND operation between the enable pulse and each of a set of serial superconducting bits of the serial data stream to generate a corresponding set of parallel superconducting bits. The SIPO cells can also each include a set of delay JTLs configured to delay at least one of the parallel superconducting bits relative to at least one other of the parallel superconducting bits. As a result, the set of parallel superconducting bits can be provided from the respective one of the SIPO cells concurrently.

As an example, the superconducting serial-to-parallel converter system can include a quantity N of the SIPO cells, and the serial data stream can include a quantity 2N of serial superconducting bits. Therefore, each of the SIPO cells can be configured to convert two of the serial superconducting bits into a pair of parallel superconducting bits. As an example, each of the serial superconducting bits can propagate through a given one of the SIPO cells at each cycle of the clock signal, and the enable pulse can likewise propagate through a given one of the SIPO cells at each cycle of the clock signal. Thus, each of the SIPO cells is configured to convert a pair of serial superconducting bits into a two-bit parallel superconducting signal at each cycle of the clock signal in order from the first SIPO cell to the last SIPO cell. The superconducting serial-to-parallel converter system can further include additional delay JTLs that can provide a different amount of delay to each of the sets of parallel superconducting bits, such that the entirety of the parallel superconducting bits can be output from the superconducting serial-to-parallel converter system concurrently on a given one clock cycle.

The superconducting serial-to-parallel converter system can thus provide a manner for converting serial data streams to parallel data in a superconducting computer system that is more efficient than conventional systems that use a fanout architecture. Particularly, in a typical superconducting fanout architecture, as the number of superconducting bits in the serial data stream becomes larger, the number of enables of the fanout structure grows exponentially to provide for an unmanageably large circuit. Such a large fanout structure can also introduce significant delay of the conventional superconducting serial-to-parallel converter system. However, by implementing the counter-propagating structure of the serial data stream and the enable pulse through the SIPO cells described herein, the superconducting serial-to-parallel converter system described herein can exhibit significant savings in die area (e.g., resulting in additional cost efficiency), energy saving by implementing fewer JTLs, and time efficiency.

Figure 1:
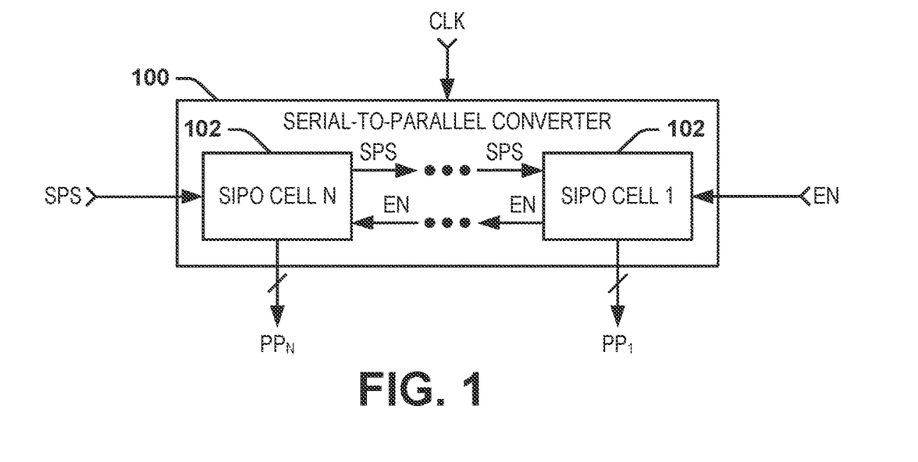
FIG. 1 illustrates an example block diagram of a superconducting serial-to-parallel converter system.

FIG. 1 illustrates an example block diagram of a superconducting serial-to-parallel converter system 100. The superconducting serial-to-parallel converter system 100 can be implemented in any of a variety of superconducting circuits to convert a serial data stream of serial superconducting bits to a corresponding set of parallel superconducting bits. As an example, the serial superconducting bits and the corresponding parallel superconducting bits can be provided as single flux quantum (SFQ) pulses or reciprocal quantum logic (RQL) pulses.

The superconducting serial-to-parallel converter system 100 includes a plurality N of serial-input-parallel-output (SIPO) cells 102 that are arranged in a serial sequence from a first SIPO cell 102 to a last (Nth) SIPO cell 102. In the example of FIG. 1, the serial data stream is demonstrated as a signal SPS, and can include a quantity 2N of serial superconducting bits. As an example, the serial data stream SPS can be provided through the serial sequence of the SIPO cells 102 from the Nth SIPO cell 102 to the first SIPO cell 102, and an enable pulse, demonstrated as a signal EN, can be provided through the serial sequence of the SIPO cells from the first SIPO cell 102 to the Nth SIPO cell 102. Thus, the serial data stream SPS and the enable pulse EN can therefore counter-propagate through the SIPO cells 102. Each of the SIPO cells 102 can be configured to convert a set of the serial superconducting bits to a corresponding set of the parallel superconducting bits, demonstrated as sets of parallel superconducting bits $PP_1$ through $PP_N$, based on the enable pulse EN and in response to a clock signal CLK.

As an example, each of the SIPO cells 102 can include a serial data path and an enable path. The serial data path can include a set of serial data Josephson transmission lines (JTLs) configured to propagate the serial superconducting bits along the serial data path through the respective one of the SIPO cells 102 based on the clock signal CLK. The enable path can include a set of enable JTLs configured to propagate the enable pulse EN along the enable path through the respective one of the SIPO cells 102 based on the clock signal CLK in a direction opposite the propagation of the serial superconducting bits. The JTLs can be clocked at different phases of the clock signal. For example, the clock signal CLK can be arranged as an RQL clock signal including in-phase and quadrature-phase components to provide 90° phase separations. Each of the SIPO cells 102 can also include a plurality of AND-gates configured to provide a logic AND operation between the enable pulse EN and each of a set of serial superconducting bits of the serial data stream SPS to generate each corresponding set of parallel superconducting bits $PP_1$ through $PP_N$. The SIPO cells 102 can also each include a set of delay JTLs configured to delay at least one of the parallel superconducting bits $PP_1$ through $PP_N$ relative to at least one other of the parallel superconducting bits $PP_1$ through $PP_N$. As a result, the set of parallel superconducting bits $PP_1$ through $PP_N$ can be provided from the respective one of the SIPO cells 102 concurrently.

As an example, the serial data stream SPS can include a quantity 2N of serial superconducting bits. Therefore, each of the SIPO cells 102 can be configured to convert two of the serial superconducting bits into a pair of parallel superconducting bits PP via a pair of AND gates. As an example, each of the serial superconducting bits can propagate through a given one of the SIPO cells 102 at each cycle of the clock signal CLK, and the enable pulse EN can likewise propagate through a given one of the SIPO cells 102 at each cycle of the clock signal CLK. However, because the serial data stream SPS and the enable pulse EN counter-propagate, a given SIPO cell 102 can perform a logic AND operation between a given one of the serial data bits and the enable pulse at each half-cycle of the clock signal CLK. Thus, each of the SIPO cells 102 is configured to convert a pair of serial superconducting bits into a two-bit parallel superconducting signal PP at each cycle of the clock signal CLK in order from the first SIPO cell 102 to the Nth SIPO cell 102. As described in greater detail herein, the superconducting serial-to-parallel converter system 100 can further include additional delay JTLs that can provide a different amount of delay to each of the sets of parallel superconducting bits $PP_1$ through $PP_N$, such that the entirety of the parallel superconducting bits $PP_1$ through $PP_N$ can be output from the superconducting serial-to-parallel converter system 100 concurrently on a given one cycle of the clock signal CLK.

Figure 2:
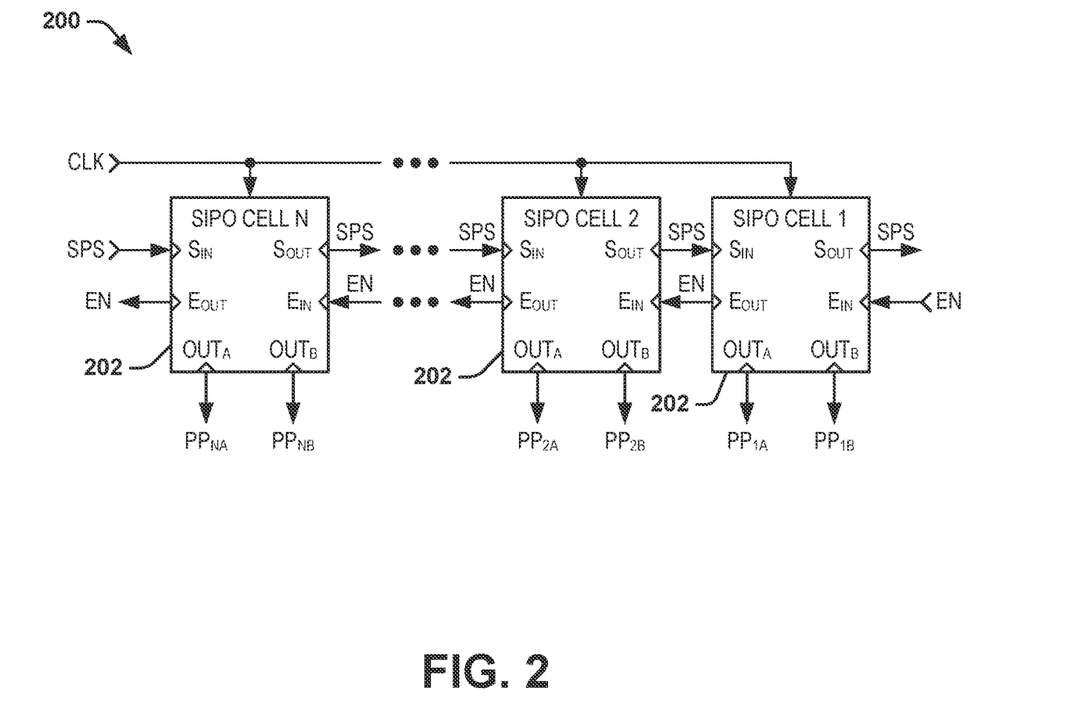
FIG. 2 illustrates an example of a superconducting serial-to-parallel converter system.

FIG. 2 illustrates an example of a superconducting serial-to-parallel converter system 200. The superconducting serial-to-parallel converter system 200 can correspond to the superconducting serial-to-parallel converter system 100 in the example of FIG. 1. Therefore, reference is to be made to the example of FIG. 1 in the following description of the example of FIG. 2.

The superconducting serial-to-parallel converter system 200 includes a plurality N of serial-input-parallel-output (SIPO) cells 202 that are arranged in a serial sequence from a first SIPO cell 202 to a last (Nth) SIPO cell 202. Each of the SIPO cells 202 includes an enable input $E_{IN}$ configured to receive the enable pulse EN and a serial data input $S_{IN}$ configured to receive the serial data stream SPS. Each of the SIPO cells 202 also includes an enable output $E_{OUT}$ configured to output the enable pulse EN and a serial data output Sour configured to output the serial data stream SPS. Each of the SIPO cells 202 thus includes an enable path that interconnects the enable input $E_{IN}$ and the enable output $E_{OUT}$, and includes a serial data path that interconnects the serial data input $S_{IN}$ and the serial data output $S_{OUT}$. In the example of FIG. 2, the N SIPO cells 202 are arranged in the sequence based on the coupling of the enable output $E_{OUT}$ of one SIPO cell 202 to the enable input $E_{IN}$ of a next SIPO cell 202 in the sequence, and the coupling of the serial data output Sour of one SIPO cell 202 to the serial data input $S_{IN}$ of a previous SIPO cell 202 in the sequence.

In the example of FIG. 2, the serial data stream SPS is provided through the serial sequence of the SIPO cells 202 from the Nth SIPO cell 202 to the first SIPO cell 202, and the enable pulse EN, is provided through the serial sequence of the SIPO cells from the first SIPO cell 202 to the Nth SIPO cell 202. Based on the coupling of the SIPO cells 202 with respect to the enable inputs $E_{IN}$ and the enable outputs $E_{OUT}$, and with respect to the serial data inputs $S_{IN}$ and the serial data outputs $S_{OUT}$, the enable pulse EN and the serial data stream SPS counter-propagate through the serial sequence of the SIPO cells 202. As an example, each of the serial data path and the enable path include JTLs that can propagate the respective serial superconducting bits of the serial data stream SPS and the enable pulse EN at each of 90° phases of the clock signal CLK.

As an example, the quantity of serial data bits can be double the quantity of the SIPO cells 202, and thus the serial data stream can have 2N serial data bits. Therefore, in the example of FIG. 2, each of the SIPO cells 202 is configured to convert a pair of the serial superconducting bits to a corresponding pair of the parallel superconducting bits at parallel outputs $OUT_A$ and $OUT_B$ based on the enable pulse EN and in response to a clock signal CLK. As an example, each of the serial superconducting bits can propagate through a given one of the SIPO cells 202 at each cycle of the clock signal CLK, and the enable pulse EN can likewise propagate through a given one of the SIPO cells 202 at each cycle of the clock signal CLK. Therefore, the enable pulse EN can be provided to the first SIPO cell 202 in response to the first serial superconducting bit of the serial data stream SPS propagating to the first SIPO cell 202 via the clock signal CLK. For example, the enable pulse EN can be provided to the superconducting serial-to-parallel converter system 200 and delayed by N cycles of the clock signal CLK concurrently with the serial data stream SPS being provided to the superconducting serial-to-parallel converter system 200. Based on the counter-propagation of the serial data stream SPS and the enable pulse EN at each of 90° phases of the clock signal CLK, a given SIPO cell 202 can perform a logic AND operation between a given one of the serial data bits SPS and the enable pulse at each half-cycle of the clock signal CLK. Thus, each of the SIPO cells 202 is configured to convert a pair of serial superconducting bits into a two-bit parallel superconducting signal PP at each cycle of the clock signal CLK in order from the first SIPO cell 202 to the Nth SIPO cell 202.

In the example of FIG. 2, the first SIPO cell 202 is configured to convert the first and second serial superconducting bits of the serial data stream SPS into a corresponding pair of parallel superconducting bits $PP_{1A}$ and $PP_{1B}$ from the respective parallel outputs $OUT_A$ and $OUT_B$ on a first cycle of the clock signal CLK. As an example, the first SIPO cell 202 can include two logic AND gates that are configured to provide a logic AND operation at each half-cycle of the clock signal CLK. The first logic AND operation (e.g., that generates the first superconducting parallel bit $PP_{1A}$ can be delayed by a half-cycle of the clock signal CLK, such that the parallel superconducting bits $PP_{1A}$ and PPIB can be provided from the first SIPO cell 202 concurrently from the respective parallel outputs $OUT_A$ and $OUT_B$ on the same cycle of the clock signal CLK.

On the next cycle of the clock signal CLK, the enable pulse EN is provided to the second SIPO cell 202 to convert the third and fourth serial superconducting bits of the serial data stream SPS into a corresponding pair of parallel superconducting bits $PP_{2A}$ and $PP_{2B}$ from the respective parallel outputs $OUT_A$ and $OUT_B$ on a second cycle of the clock signal CLK. The enable pulse EN can thus continue to propagate through the SIPO cells 202 to the Nth SIPO cell 202 while the serial data stream SPS continues to propagate through the SIPO cells 202 from the Nth SIPO cell 202 to the first SIPO cell 202 until the Nth SIPO cell 202 converts the 2N−1 and 2N superconducting serial bits into an Nth pair of superconducting parallel bits PPNA and $PP_{NB}$ from the respective parallel outputs $OUT_A$ and $OUT_B$ on the Nth cycle of the clock signal CLK.

Figure 3:
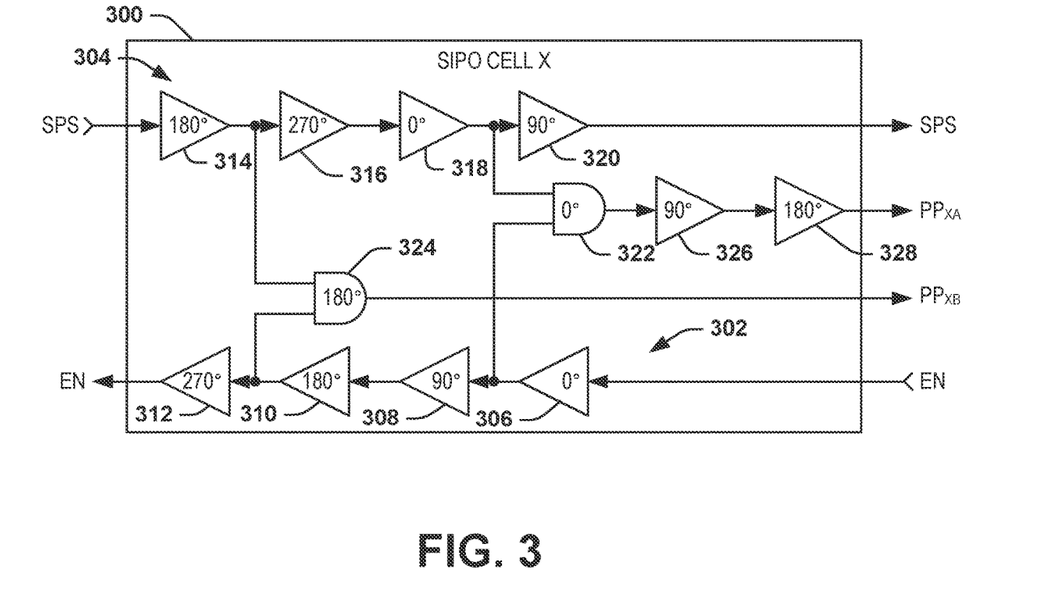
FIG. 3 illustrates an example diagram of a SIPO cell.

FIG. 3 illustrates an example diagram of a SIPO cell 300. The SIPO cell 300 can correspond to any of the SIPO cells 202 in the example of FIG. 2. Therefore, reference is to be made to the example of FIG. 2 in the following description of the example of FIG. 3. The SIPO cell 300 is demonstrated as an Xth SIPO cell of the serial sequence of the SIPO cells 202, where X is an index corresponding to any of the N SIPO cells 202.

The SIPO cell 300 includes an enable path 302 through which the enable pulse EN propagates and a serial data path 304 through which the serial data stream SPS propagates. The enable path 302 includes a first JTL 306 that operates at 0° phase of the clock signal CLK, a second JTL 308 that operates at 90° phase of the clock signal CLK, a third JTL 310 that operates at 180° phase of the clock signal CLK, and a fourth JTL 312 that operates at 270° phase of the clock signal CLK. Therefore, the enable pulse EN is provided to the first JTL 306 via an enable input (e.g., the enable input $E_{IN}$) at the 270° phase of the clock signal CLK, is provided through the first JTL 306 at the 0° phase of the clock signal CLK, is provided through the second JTL 308 at the 90° phase of the clock signal CLK. The enable pulse is then provided through the third JTL 310 at the 180° phase of the clock signal CLK, and is provided through fourth JTL 312 at the 270° phase of the clock signal CLK to be output from the SIPO cell 300 via an enable output (e.g., the enable output $E_{OUT}$).

The serial data path 304 includes a first JTL 314 that operates at 180° phase of the clock signal CLK, a second JTL 316 that operates at 270° phase of the clock signal CLK, a third JTL 318 that operates at 0° phase of the clock signal CLK, and a fourth JTL 320 that operates at 90° phase of the clock signal CLK. Therefore, a serial superconducting bit of the serial data stream SPS is provided to the first JTL 314 via a serial input (e.g., the serial input $S_{IN}$) at the 90° phase of the clock signal CLK, is provided through the first JTL 314 at the 180° phase of the clock signal CLK, is provided through the second JTL 316 at the 270° phase of the clock signal CLK. The enable pulse is then provided through the third JTL 318 at the 0° phase of the clock signal CLK, and is provided through fourth JTL 320 at the 90° phase of the clock signal CLK to be output from the SIPO cell 300 via a serial output (e.g., the serial output $S_{OUT}$). At the time that the serial superconducting bit is provided from the SIPO cell 300 at the 90° phase of the clock signal CLK, the next serial superconducting bit of the serial data stream SPS is provided to the first JTL 314 via the serial input at the 90° phase of the clock signal CLK.

In the example of FIG. 3, the enable path 302 and the serial data path 304 are demonstrated as counter-propagating through the SIPO cell 300. Additionally, the JTLs 306, 308, 310, and 312 of the enable path 302 are demonstrated as staggered with respect to phase relative to the JTLs 314, 316, 318, and 320 of the serial data path 304. In the example of FIG. 3, the JTLs 306, 308, 310, and 312 of the enable path 302 are out-of-phase relative to the JTLs 314, 316, 318, and 320 of the serial data path 304 by 180° with respect to being provided to and from the SIPO cell 300. As a result, a serial superconducting bit of the serial data stream SPS can have propagated halfway through the SIPO cell 300 at the time that the enable pulse EN is provided to the SIPO cell 300. In this manner, the SIPO cell 300 can generate a pair of superconducting parallel output bits $PP_{XA}$ and $PP_{XB}$ from respective parallel outputs (e.g., parallel outputs $OUT_A$ and $OUT_B$) at each full cycle of the clock signal CLK, as described in greater detail herein.

The SIPO cell 300 includes a first logic AND gate 322 and a second logic AND gate 324. The first logic AND gate 322 is demonstrated as operating at the 0° phase and has a first input that is coupled to the output of the JTL 306 and a second input that is coupled to the output of the JTL 318. The JTLs 306 and 318 each also operate at the 0° phase of the clock signal CLK. Therefore, the first logic AND gate 322 provides a logic AND operation between the enable pulse EN and a superconducting serial bit at the 0° phase of the clock signal CLK. Similarly, the second logic AND gate 324 is demonstrated as operating at the 180° phase and has a first input that is coupled to the output of the JTL 310 and a second input that is coupled to the output of the JTL 314. The JTLs 310 and 314 each also operate at the 180° phase of the clock signal CLK. Therefore, the second logic AND gate 324 provides a logic AND operation between the enable pulse EN and a superconducting serial bit at the 180° phase of the clock signal CLK.

The first logic AND gate 322 thus provides the first logic AND operation to generate the first superconducting parallel bit $PP_{XA}$ at the 0° phase of the clock signal CLK and the second logic AND gate 324 thus provides the second logic AND operation to generate the second superconducting parallel bit $PP_{XB}$ at the 180° phase of the clock signal CLK. The second logic AND gate 324 therefore provides the logic AND operation 180° subsequent to the logic AND operation of the first logic AND gate 322. To provide the superconducting parallel output bits $PP_{XA}$ and $PP_{XB}$ concurrently, the SIPO cell 300 includes a first delay JTL 326 and a second delay JTL 328 that are configured to delay the first superconducting parallel bit $PP_{XA}$. The first delay JTL 326 operates on the 90° phase of the clock signal CLK and the second delay JTL 328 operates on the 180° phase of the clock signal CLK. Therefore, at the 180° phase of the clock signal CLK, the second delay JTL 328 and the second logic AND gate 324 provide the superconducting parallel bits $PP_{XA}$ and $PP_{XB}$ concurrently, such that the superconducting parallel bits $PP_{XA}$ and $PP_{XB}$ are output concurrently from the SIPO cell 300 at the same 180° cycle of the clock signal CLK.

Figure 4:
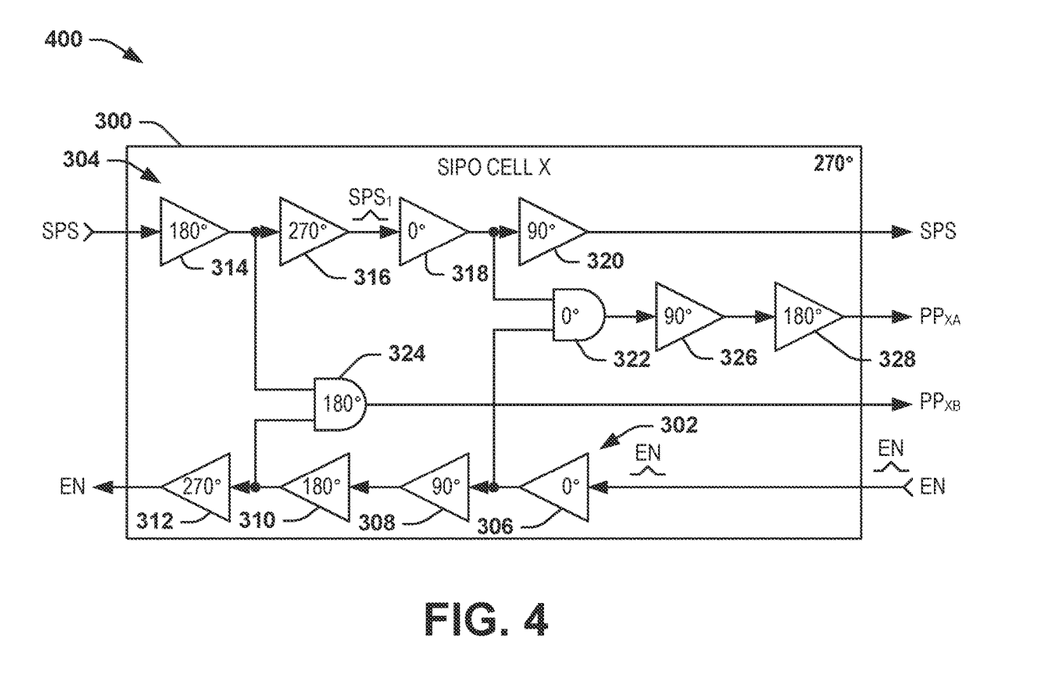
FIG. 4 illustrates another example diagram of a SIPO cell.

FIG. 4 illustrates another example diagram 400 of the SIPO cell 300. The diagram 400 demonstrates the state of the SIPO cell 300 at the 270° phase of the clock signal CLK. In the example of FIG. 4, a first superconducting serial bit $SPS_1$ is provided at the output of the JTL 316 and the enable pulse EN is provided at the enable input (e.g., the enable input $E_{IN}$) of the SIPO cell 300. The enable pulse EN is thus provided to the JTL 306.

Figure 5:
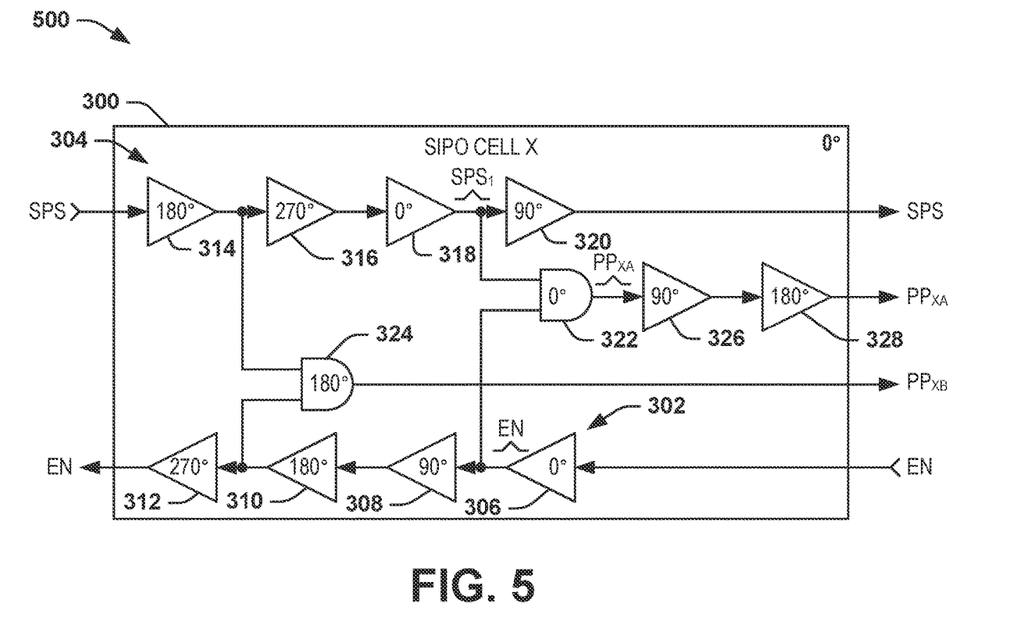
FIG. 5 illustrates another example diagram of a SIPO cell.

FIG. 5 illustrates another example diagram 500 of the SIPO cell 300. The diagram 500 demonstrates the state of the SIPO cell 300 at the 0° phase of the clock signal CLK. In the example of FIG. 5, the first superconducting serial bit $SPS_1$ propagates through and is output from the JTL 318. Similarly, the enable pulse EN propagates through and is output from the JTL 306. The first superconducting serial bit $SPS_1$ and the enable pulse EN are thus both provided as inputs to the first logic AND gate 322. The first logic AND gate 322 thus provides a logic AND operation on the first superconducting serial bit $SPS_1$ and the enable pulse EN to provide the first parallel output bit $PP_{XA}$ corresponding to the first superconducting serial bit $SPS_1$ at the output of the first logic AND gate 322.

Figure 6:
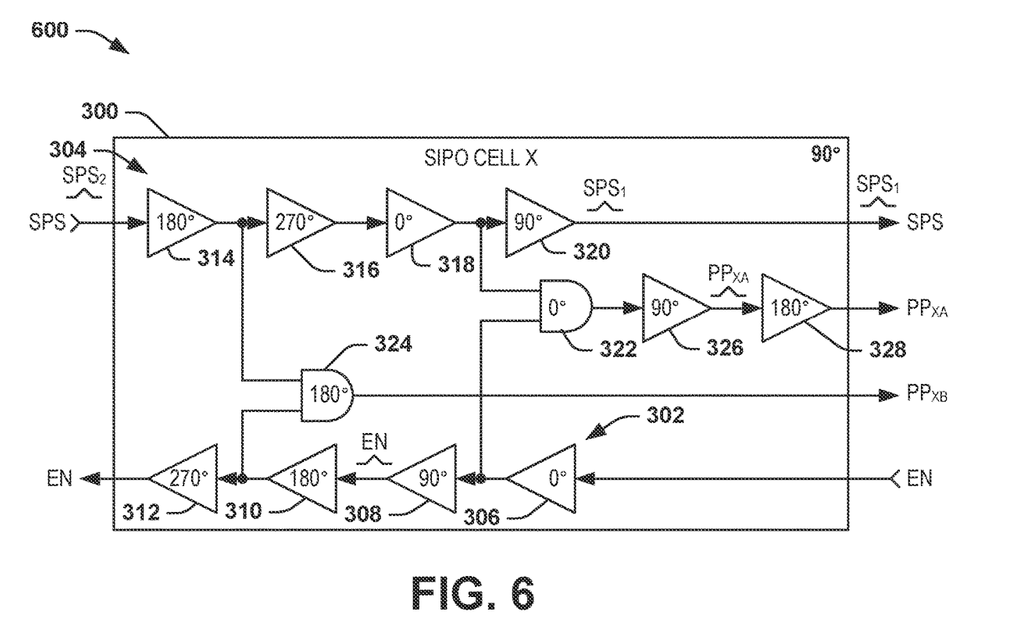
FIG. 6 illustrates another example diagram of a SIPO cell.

FIG. 6 illustrates another example diagram 600 of a SIPO cell 300. The diagram 600 demonstrates the state of the SIPO cell 300 at the 90° phase of the clock signal CLK. In the example of FIG. 6, the first superconducting serial bit $SPS_1$ propagates through and is output from the JTL 320, and is therefore output from the SIPO cell 300 (e.g., from the serial data output $S_{OUT}$). Similarly, the enable pulse EN propagates through and is output from the JTL 308. Additionally, the first parallel output bit $PP_{XA}$ corresponding to the first superconducting serial bit $SPS_1$ propagates through and is output from the first delay JTL 326. Furthermore, a second superconducting serial bit $SPS_2$ is provided at the serial input (e.g., the serial input $S_{IN}$) of the SIPO cell 300, and is thus provided to the JTL 314.

Figure 7:
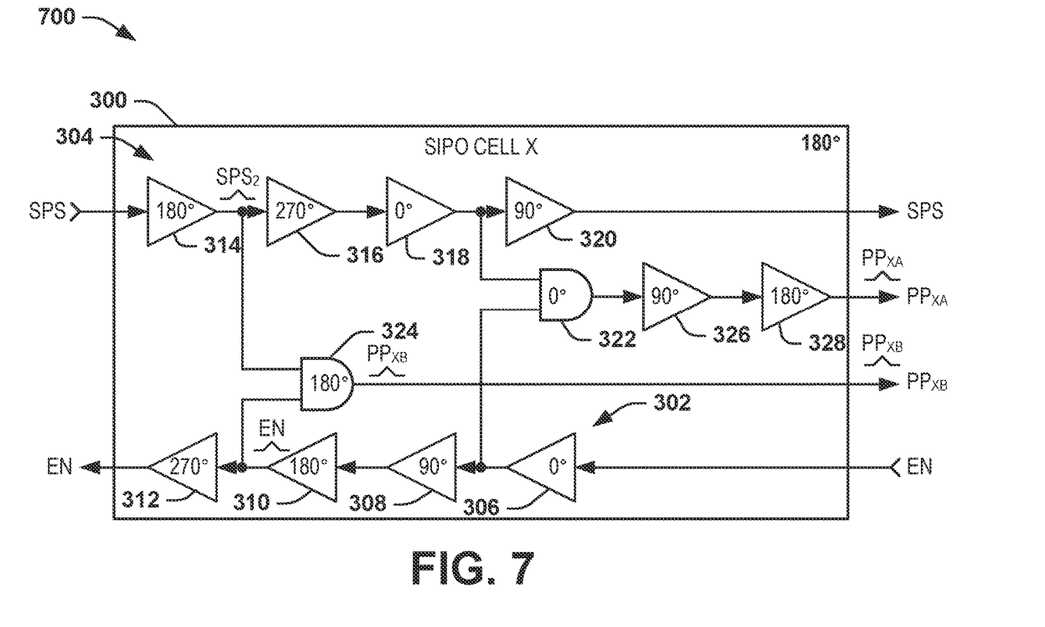
FIG. 7 illustrates another example diagram of a SIPO cell.

FIG. 7 illustrates another example diagram 700 of the SIPO cell 300. The diagram 700 demonstrates the state of the SIPO cell 300 at the 180° phase of the clock signal CLK. In the example of FIG. 7, the second superconducting serial bit $SPS_2$ propagates through and is output from the JTL 314.

Similarly, the enable pulse EN propagates through and is output from the JTL 310. The second superconducting serial bit $SPS_2$ and the enable pulse EN are thus both provided as inputs to the second logic AND gate 324. The first parallel output bit $PP_{XA}$ corresponding to the first superconducting serial bit $SPS_1$ propagates through and is output from the second delay JTL 328. The first parallel output bit $PP_{XA}$ is thus output from the SIPO cell 300 via the first parallel output (e.g., $OUT_A$). The second logic AND gate 324 provides a logic AND operation on the second superconducting serial bit $SPS_2$ and the enable pulse EN to provide the second parallel output bit $PP_{XB}$ corresponding to the second superconducting serial bit $SPS_2$ at the output of the second logic AND gate 324. The second parallel output bit $PP_{XB}$ is thus output from the SIPO cell 300 via the second parallel output (e.g., $OUT_B$). Accordingly, the first and second parallel output bits $PP_{XA}$ and $PP_{XB}$ corresponding respectively to the first and second superconducting serial bits $SPS_1$ and $SPS_2$ are concurrently output from the SIPO cell 300 at the at the same 180° cycle of the clock signal CLK.

Figure 8:
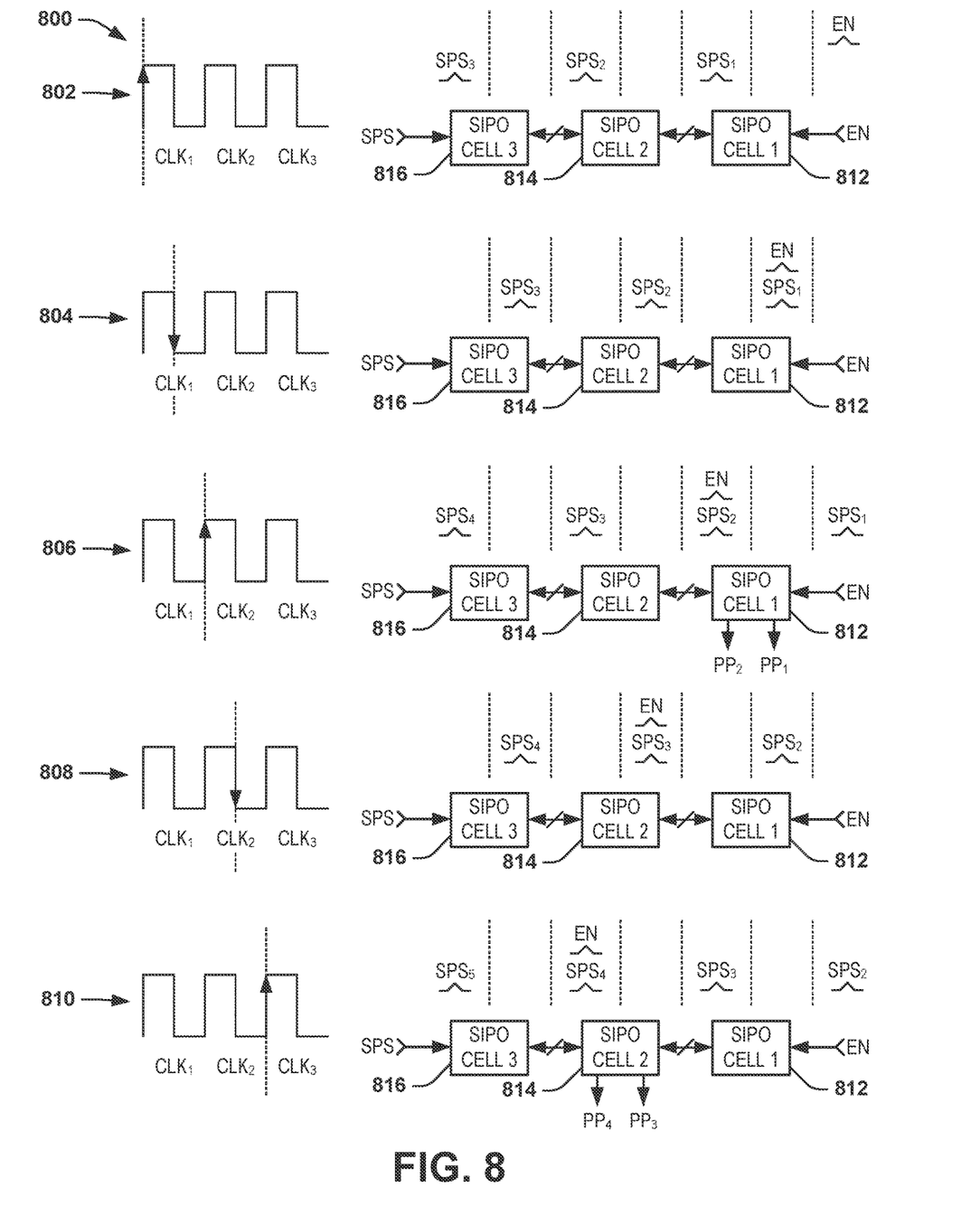
FIG. 8 illustrates another diagram of parallelizing serial data.

FIG. 8 illustrates a diagram 800 of parallelizing serial data. The diagram 800 includes a first clock phase 802, a second clock phase 804, a third clock phase 806, a fourth clock phase 808, and a fifth clock phase 810. The clock phases 802, 804, 806, 808, and 810 can each correspond to half-cycles of the clock signal CLK. The clock signal CLK is demonstrated in the example of FIG. 8 as being at half-cycles, but it is to be understood that the clock signal CLK operates on quarter-cycles (90° increments) as described above in the examples of FIGS. 4-7.

The diagram 800 also demonstrates a first SIPO cell 812, a second SIPO cell 814, and a third SIPO cell 816. The diagram 800 demonstrates the interaction of multiple bits of the serial data stream SPS with the enable pulse EN across multiple cycles of the clock signal CLK. The SIPO cells 812, 814, and 816 can each correspond to the SIPO cell 300 in the example of FIG. 3, and one of the SIPO cells 202 in the example of FIG. 2. It is to be understood that a given superconducting serial-to-parallel converter system can include significantly more than just the three SIPO cells 812, 814, and 816 demonstrated in the example of FIG. 8. Therefore, reference is to be made to the example of FIGS. 1-7 in the following description of the example of FIG. 8.

At the first clock phase 802, demonstrated as the rising-edge of a first clock cycle $CLK_1$, a first superconducting serial bit $SPS_1$ is in the first SIPO cell 812, a second superconducting serial bit $SPS_2$ is in the second SIPO cell 814, and a third superconducting serial bit $SPS_3$ is in the third SIPO cell 816. Also at the first clock phase 802, the enable pulse EN is demonstrated as outside of the first SIPO cell 812. The dotted lines above SIPO cells 812, 814, and 816 represent 180° phase boundaries, and thus the relative position of the superconducting serial bits of the serial data stream, as well as the enable pulse EN, at different phases of the clock signal CLK. For example, the first clock phase 802 can correspond to a time at which the first superconducting serial bit $SPS_1$ has propagated through the JTL 314 at the 180° phase of the clock signal CLK in the example of FIG. 3, and thus 90° prior to the diagram 400 in the example of FIG. 4.

At the second clock phase 804, demonstrated as the falling-edge of the first clock cycle $CLK_1$, the first superconducting serial bit $SPS_1$ propagates through a portion of the first SIPO cell 812, the second superconducting serial bit $SPS_2$ propagates through a portion of the second SIPO cell 814, and the third superconducting serial bit $SPS_3$ propagates through a portion of the third SIPO cell 816. Also at the second clock phase 804, the enable pulse EN propagates into the first SIPO cell 812. At the second clock phase 804, the first superconducting serial bit $SPS_1$ and the enable pulse EN can be provided to the first logic AND gate (e.g., the first logic AND gate 322) of the first SIPO cell 812 to provide the first superconducting parallel bit $PP_1$ corresponding to the first superconducting serial bit $SPS_1$. For example, the second clock phase 804 can correspond to the 0° diagram 500 in the example of FIG. 5 with respect to the first SIPO cell 812.

At the third clock phase 806, demonstrated as the rising-edge of a second clock cycle $CLK_2$, the first superconducting serial bit $SPS_1$ is output from the first SIPO cell 812, the second superconducting serial bit $SPS_2$ propagates into the first SIPO cell 812, the third superconducting serial bit $SPS_3$ propagates into the second SIPO cell 814, and a fourth superconducting serial bit $SPS_4$ propagates into the third SIPO cell 816. Also at the third clock phase 806, the enable pulse EN propagates through a portion of the first SIPO cell 812. At the third clock phase 806, the second superconducting serial bit $SPS_1$ and the enable pulse EN can be provided to the second logic AND gate (e.g., the second logic AND gate 324) of the first SIPO cell 812 to provide the second superconducting parallel bit $PP_2$ corresponding to the second superconducting serial bit $SPS_2$. Because the first superconducting parallel output bit $PP_1$ is delayed 180°, both the first and second superconducting parallel output bits $PP_{1A}$ and $PP_2$ are output concurrently at the third clock phase 806. For example, the third clock phase 806 can correspond to the 180° diagram 700 in the example of FIG. 7 with respect to the first SIPO cell 812.

At the fourth clock phase 808, demonstrated as the falling-edge of the second clock cycle $CLK_2$, the second superconducting serial bit $SPS_2$ propagates through a portion of the first SIPO cell 812, the third superconducting serial bit $SPS_3$ propagates through a portion of the second SIPO cell 814, and the fourth superconducting serial bit $SPS_4$ propagates through a portion of the third SIPO cell 816. Also at the fourth clock phase 808, the enable pulse EN propagates into the second SIPO cell 814. At the fourth clock phase 808, the third superconducting serial bit $SPS_3$ and the enable pulse EN can be provided to the first logic AND gate (e.g., the first logic AND gate 322) of the second SIPO cell 814 to provide the third superconducting parallel bit $PP_3$ corresponding to the third superconducting serial bit $SPS_3$. For example, the fourth clock phase 804 can correspond to the 0° diagram 500 in the example of FIG. 5 with respect to the second SIPO cell 814.

At the fifth clock phase 810, demonstrated as the rising-edge of a third clock cycle $CLK_3$, the second superconducting serial bit $SPS_2$ is output from the first SIPO cell 812, the third superconducting serial bit $SPS_3$ propagates into the first SIPO cell 812, the fourth superconducting serial bit $SPS_4$ propagates into the second SIPO cell 814, and a fifth superconducting serial bit $SPS_3$ propagates into the third SIPO cell 816. Also at the fifth clock phase 810, the enable pulse EN propagates through a portion of the second SIPO cell 814. At the fifth clock phase 810, the fourth superconducting serial bit $SPS_4$ and the enable pulse EN can be provided to the second logic AND gate (e.g., the second logic AND gate 324) of the second SIPO cell 814 to provide the fourth superconducting parallel bit $PP_4$ corresponding to the fourth superconducting serial bit $SPS_4$. Because the third superconducting parallel output bit $PP_3$ is delayed 180°, both the third and fourth superconducting parallel output bits $PP_3$ and $PP_4$ are output concurrently at the fifth clock phase 810.

For example, the fifth clock phase 810 can correspond to the 180° diagram 700 in the example of FIG. 7 with respect to the second SIPO cell 814.

The propagation of the serial data stream SPS and the enable pulse through the SIPO cells of the respective superconducting serial-to-parallel converter system can continue until the enable pulse propagates through the Nth SIPO cell and the Nth SIPO cell provides a logic AND operation between the enable pulse EN and the 2Nth superconducting serial bit. Thus, each SIPO cell providing a pair of superconducting parallel bits PP at each cycle of the clock signal CLK. Accordingly, the serial data stream SPS can be parallelized over N clock cycles. Additionally, as described in greater detail herein, the superconducting parallel bits PP provided from the SIPO cells can be delayed by a variable amount, such that all of the superconducting parallel bits PP can be provided concurrently from the superconducting serial-to-parallel converter system (e.g., from an associated integrated circuit (IC) that includes the superconducting serial-to-parallel converter system) on the same cycle of the clock signal CLK. While the examples of FIGS. 3-8 demonstrate that the SIPO cells generate a pair of superconducting parallel outputs at each clock cycle, other arrangements of the SIPO cells to generate more than two superconducting parallel outputs are possible. Additionally, it is possible for each SIPO cell to output a single bit corresponding to a superconducting serial bit of the serial data stream SPS, such that delay elements can be implemented to provide the single output bits from the respective SIPO cells in a parallel manner.

Figure 9:
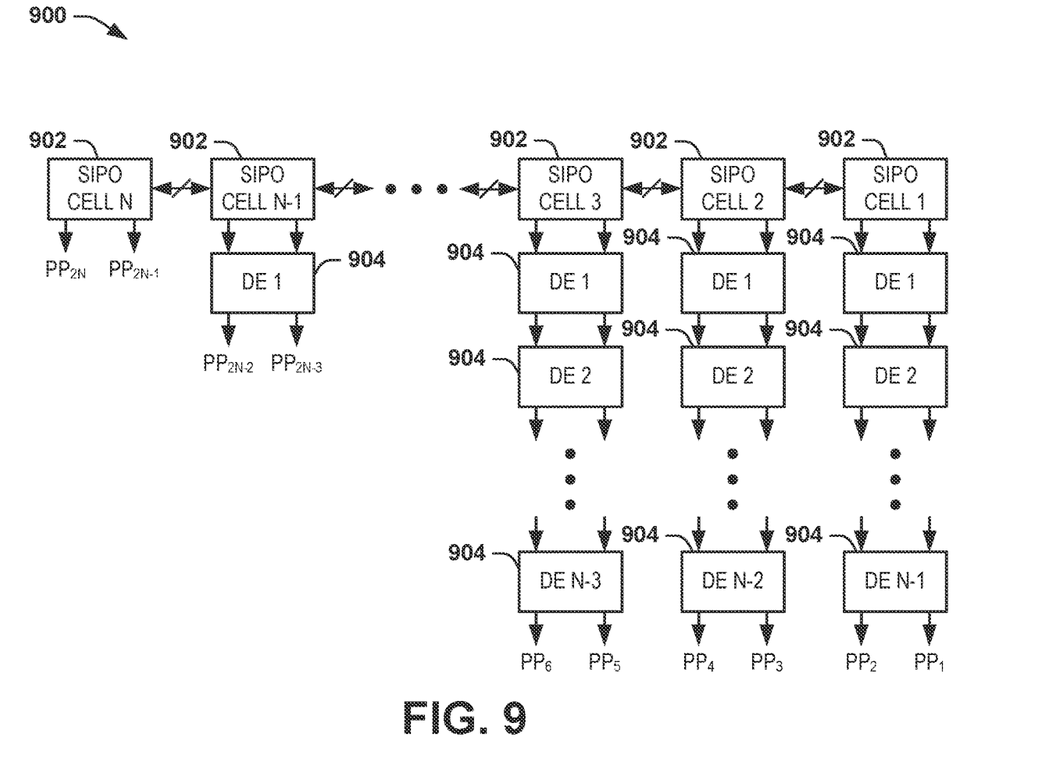
FIG. 9 illustrates another example of a superconducting serial-to-parallel converter system.

FIG. 9 illustrates another example of a superconducting serial-to-parallel converter system 900. The superconducting serial-to-parallel converter system 900 includes a plurality N of SIPO cells 902. The superconducting serial-to-parallel converter system 900 can correspond to the superconducting serial-to-parallel converter system 100 in the example of FIG. 1, and the SIPO cells 902 can correspond to the SIPO cells 202 and 300 in the respective examples of FIGS. 2 and 3. Therefore, reference is to be made to the examples of FIGS. 1-8 in the following description of the example of FIG. 9.

Similar to as described above regarding the example of FIG. 2, the SIPO cells 902 are arranged in a serial sequence from a first SIPO cell 902 to a last (Nth) SIPO cell 902. The enable pulse EN and the serial data input $S_{IN}$ are configured to counter-propagate through the SIPO cells 902 in opposite directions, such that each of the SIPO cells 902 is configured to convert a pair of the superconducting serial bits SPS into a corresponding pair of parallel superconducting bits PP.

As described above, each of the SIPO cells 902 generates the pair of parallel superconducting bits PP at each cycle of the clock signal CLK from the first SIPO cell 902 to the Nth SIPO cell 902. In the example of FIG. 9, the superconducting serial-to-parallel converter system 900 includes a plurality of delay elements ("DE") 904 that are configured to delay the parallel superconducting bits PP from each of the SIPO cells 902 by variable amounts. As an example, each of the delay elements 904 can be configured as JTLs that are clocked by a given 90° phase increment, similar to the delay JTLs 326 and 328 in the example of FIG. 3. Accordingly, each of the delay elements 904 can be configured to propagate the superconducting parallel bits PP at each of 90° increments in a sequence based on the clock signal CLK.

In the example of FIG. 9, the first SIPO cell 902 provides the first pair of superconducting parallel bits $PP_1$ and $PP_2$ through a quantity N-1 delay elements 904. Therefore, the first SIPO cell 902 provides the first pair of superconducting parallel bits $PP_1$ and $PP_2$ on a first cycle of the clock signal CLK, and the N-1 delay elements 904 propagate the first pair of superconducting parallel bits $PP_1$ and $PP_2$ on each of subsequent cycles of the clock signal CLK. Thus, on the Nth cycle of the clock signal CLK, the N-1 delay element 904 provides the first pair of superconducting parallel bits $PP_1$ and $PP_2$ on the Nth cycle of the clock signal CLK.

Similarly, the second SIPO cell 902 provides the second pair of superconducting parallel bits $PP_3$ and $PP_4$ through a quantity N-2 delay elements 904. Therefore, the second SIPO cell 902 provides the second pair of superconducting parallel bits $PP_3$ and $PP_4$ on a second cycle of the clock signal CLK, and the N-2 delay elements 904 propagate the second pair of superconducting parallel bits $PP_3$ and $PP_4$ on each of subsequent cycles of the clock signal CLK. Thus, on the Nth cycle of the clock signal CLK, the N-2 delay element 904 provides the second pair of superconducting parallel bits $PP_3$ and $PP_4$ on the Nth cycle of the clock signal CLK, concurrently with the first pair of superconducting parallel bits $PP_1$ and $PP_2$.

Therefore, each of the SIPO cells 902 in the serial sequence from the first SIPO cell 902 to the Nth SIPO cell 902 provides a respective delay that is one clock cycle fewer than the previous SIPO cell 902 in the serial sequence. In the example of FIG. 9, the N-1 SIPO cell 902 provides the penultimate pair of superconducting parallel bits $PP_{2N-3}$ and $PP_{2N-2}$ through a single delay element 904. Therefore, the N-1 SIPO cell 902 provides the penultimate pair of superconducting parallel bits $PP_{2N-3}$ and $PP_{2N-2}$ on the N-1 cycle of the clock signal CLK, and the single delay element 904 propagates the penultimate pair of superconducting parallel bits $PP_{2N-3}$ and $PP_{2N-2}$ on the subsequent cycle of the clock signal CLK. Thus, on the Nth cycle of the clock signal CLK, the single delay element 904 provides the penultimate pair of superconducting parallel bits $PP_{2N-3}$ and $PP_{2N-2}$ on the Nth cycle of the clock signal CLK, concurrent with the pairs of superconducting parallel bits of all of the preceding SIPO cells 902 in the serial sequence.

Lastly, the last SIPO cell 902 has no associated delay elements 904, and thus provides the last pair of superconducting parallel bits $PP_{2N-1}$ and $PP_{2N}$ without any delay. Therefore, the last SIPO cell 902 provides the last pair of superconducting parallel bits $PP_{2N-1}$ and $PP_{2N}$ on the Nth cycle of the clock signal CLK, concurrently with the pairs of superconducting parallel bits of all of the preceding SIPO cells 902 in the serial sequence. In this manner, all of the superconducting parallel bits PP of all of the SIPO cells 902 can be output from the superconducting serial-to-parallel converter system 900 concurrently on the same cycle of the clock signal CLK.

Figure 10:
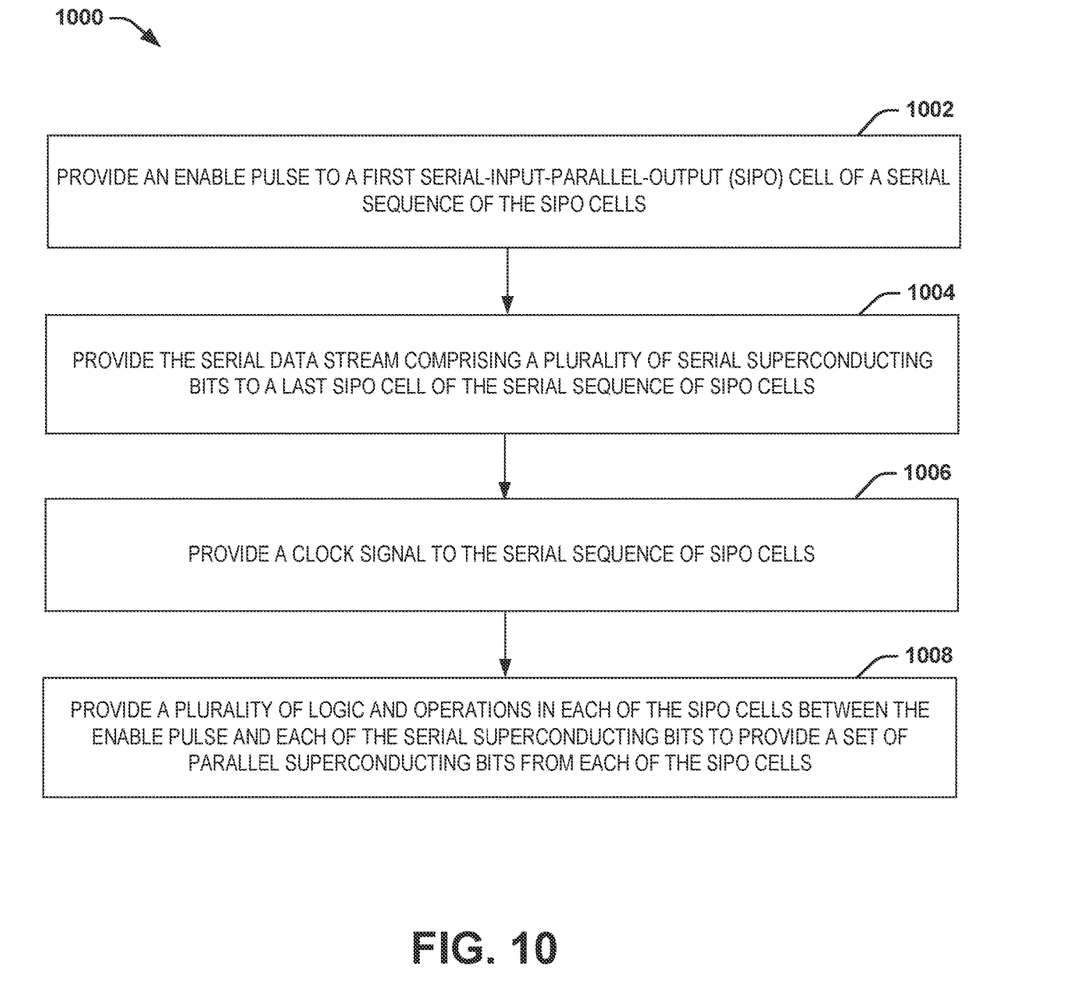
FIG. 10 illustrates an example of a method for converting superconducting pulses from a serial data stream to parallel data bits.

In view of the foregoing structural and functional features described above, a methodology in accordance with various aspects of the disclosure will be better appreciated with reference to FIG. 10. It is to be understood and appreciated that the method of FIG. 10 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

FIG. 10 illustrates an example of a method 1000 for converting superconducting pulses from a serial data stream (e.g., the serial data streams SPS) to parallel data bits (e.g., the superconducting parallel bits PP). At 1002, an enable pulse (e.g., the enable pulse EN) is provided to a first SIPO cell (e.g., the serial data streams SPS) of a serial sequence of the SIPO cells (e.g., the SIPO cells 102). At 1004, the serial data stream comprising a plurality of serial superconducting bits is provided to a last SIPO cell of the serial sequence of SIPO cells. At 1006, a clock signal (e.g., the clock signal CLK) is provided to the serial sequence of SIPO cells. The serial data stream can propagate from the last SIPO cell to the first SIPO cell and the enable pulse can propagate from the first SIPO cell to the last SIPO cell. At 1008, a plurality of logic AND operations (e.g., from the logic AND gates 322 and 324) are provided in each of the SIPO cells between the enable pulse and each of the serial superconducting bits to provide a set of parallel superconducting bits from each of the SIPO cells.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A superconducting serial-to-parallel converter system comprising a plurality of serial-input-parallel-output (SIPO) cells arranged in a sequence between a first SIPO cell and a last SIPO cell, wherein each of the SIPO cells is configured to convert a plurality of serial superconducting bits of a serial data stream into a set of parallel superconducting bits in response to an enable pulse, wherein the serial data stream is provided through the sequence of the SIPO cells from the last SIPO cell to the first SIPO cell based on a clock signal, wherein the enable pulse is provided through the sequence of SIPO cells from the first SIPO cell to the last SIPO cell based on the clock signal.

2. The system of claim 1, wherein the superconducting serial-to-parallel convert system comprises N SIPO cells, wherein the serial data stream comprises 2×N serial superconducting bits, such that each of the SIPO cells is configured to convert a pair of serial superconducting bits into a two-bit parallel superconducting signal.

3. The system of claim 2, wherein each of the serial superconducting bits propagates through a given one of the SIPO cells at each cycle of the clock signal, and wherein the enable pulse propagates through a given one of the SIPO cells at each cycle of the clock signal, such that each of the SIPO cells is configured to convert a pair of serial superconducting bits into a two-bit parallel superconducting signal at each cycle of the clock signal in order from the first SIPO cell to the last SIPO cell.

4. The system of claim 3, wherein the enable pulse is provided to the first SIPO cell in response to a first serial superconducting bit of the serial data stream propagating through the SIPO cells to the first SIPO cell.

5. The system of claim 1, wherein each of the SIPO cells comprises a plurality of AND-gates configured to provide a logic AND operation between the enable pulse and each of the plurality of serial superconducting bits of the serial data stream to generate the set of parallel superconducting bits.

6. The system of claim 5, wherein each of the SIPO cells further comprises a set of Josephson transmission lines (JTLs) configured to delay at least one of the parallel superconducting bits relative to at least one other of the parallel superconducting bits, such that the set of parallel superconducting bits are provided from the respective one of the SIPO cells concurrently.

7. The system of claim 6, wherein each of the SIPO cells is configured to convert a pair of serial superconducting bits into a two-bit parallel superconducting signal at each half-cycle of the clock signal, wherein each of the SIPO cells comprises two JTLs to delay one of the parallel superconducting bits relative to the other one of the parallel superconducting bits by a half-cycle of the clock signal, such that the set of parallel superconducting bits are provided from the respective one of the SIPO cells concurrently.

8. The system of claim 5, wherein each of the SIPO cells comprises a serial data stream path and an enable path, wherein each of the serial data path and the enable path comprise Josephson transmission lines (JTLs) configured to propagate the serial superconducting bits and the enable pulse, respectively, in opposite directions through the respective one of the SIPO cells based on the clock signal.

9. The system of claim 5, wherein each of the SIPO cells comprises a first AND-gate and a second AND-gate, wherein the first AND-gate is configured to provide the logic AND operation between the enable pulse and a first serial superconducting bit at a first phase of the clock signal, wherein the second AND-gate is configured to provide the logic AND operation between the enable pulse and a second serial superconducting bit at a second phase of the clock signal that is 180° out-of-phase of the first phase of the clock signal.

10. The system of claim 1, further comprising a plurality of delay elements configured to delay each set of the parallel superconducting bits by a different number of clock cycles, such that each of the sets of the parallel superconducting bits are output from the superconducting serial-to-parallel converter system concurrently on a same clock cycle.

11. A method for converting superconducting pulses from a serial data stream to parallel data bits, the method comprising:
providing an enable pulse to a first serial-input-parallel-output (SIPO) cell of a serial sequence of the SIPO cells;
providing the serial data stream comprising a plurality of serial superconducting bits to a last SIPO cell of the serial sequence of SIPO cells;
providing a clock signal to the serial sequence of SIPO cells, such that the serial data stream propagates from the last SIPO cell to the first SIPO cell and the enable pulse propagates from the first SIPO cell to the last SIPO cell; and
providing a plurality of logic AND operations in each of the SIPO cells between the enable pulse and each of the serial superconducting bits to provide a set of parallel superconducting bits from each of the SIPO cells.

12. The method of claim 11, wherein the superconducting serial-to-parallel convert system comprises N SIPO cells, wherein the serial data stream comprises 2×N serial superconducting bits, wherein providing the clock signal comprises:
propagating each of the serial superconducting bits through a given one of the SIPO cells at each cycle of the clock signal; and
propagating the enable pulse through a given one of the SIPO cells at each cycle of the clock signal, such that each of the SIPO cells is configured to convert a pair of serial superconducting bits into a two-bit parallel superconducting signal at each cycle of the clock signal in order from the first SIPO cell to the last SIPO cell.

13. The method of claim 11, further comprising delaying at least one of the parallel superconducting bits relative to at least one other of the parallel superconducting bits via a set of Josephson transmission lines (JTLs), such that the set of parallel superconducting bits are provided from the respective one of the SIPO cells concurrently.

14. The method of claim 11, wherein each of the SIPO cells comprises a serial data stream path and an enable path, wherein providing the clock signal comprises providing the clock signal to each of Josephson transmission lines (JTLs) associated with the serial data path and JTLs associated with the enable path to propagate the serial superconducting bits and the enable pulse, respectively, in opposite directions through the respective one of the SIPO cells.

15. The method of claim 11, further comprising delaying each set of the parallel superconducting bits by a different number of clock cycles, such that each of the sets of the parallel superconducting bits are output from an associated superconducting serial-to-parallel converter system concurrently on a same clock cycle.

16. A superconducting serial-to-parallel converter system comprising a plurality of serial-input-parallel-output (SIPO) cells arranged in a sequence between a first SIPO cell and a last SIPO cell, wherein an enable pulse is provided through the sequence of SIPO cells from the first SIPO cell to the last SIPO cell based on a clock signal, wherein a serial data stream is provided through the sequence of the SIPO cells from the last SIPO cell to the first SIPO cell based on a clock signal, wherein each of the SIPO cells comprises:
a serial data path comprising a set of serial data Josephson transmission lines (JTLs) configured to propagate the serial superconducting bits along the serial data path through the respective one of the SIPO cells based on the clock signal;
an enable path comprising a set of enable JTLs configured to propagate the enable pulse along the enable path through the respective one of the SIPO cells based on the clock signal in a direction opposite the propagation of the serial superconducting bits;
a plurality of AND-gates configured to provide a logic AND operation between the enable pulse and each of a set of serial superconducting bits of the serial data stream to generate a corresponding set of parallel superconducting bits; and
a set of delay JTLs configured to delay at least one of the parallel superconducting bits relative to at least one other of the parallel superconducting bits, such that the set of parallel superconducting bits are provided from the respective one of the SIPO cells concurrently.

17. The system of claim 16, wherein the superconducting serial-to-parallel convert system comprises N SIPO cells, wherein the serial data stream comprises 2×N serial superconducting bits, such that each of the SIPO cells is configured to convert a pair of serial superconducting bits into a two-bit parallel superconducting signal.

18. The system of claim 17, wherein each of the serial superconducting bits propagates through a given one of the SIPO cells at each cycle of the clock signal, and wherein the enable pulse propagates through a given one of the SIPO cells at each cycle of the clock signal, such that each of the SIPO cells is configured to convert a pair of serial superconducting bits into a two-bit parallel superconducting signal at each cycle of the clock signal in order from the first SIPO cell to the last SIPO cell.

19. The system of claim 16, wherein each of the SIPO cells is configured to convert a pair of serial superconducting bits into a two-bit parallel superconducting signal at each half-cycle of the clock signal, wherein each of the SIPO cells comprises two JTLs to delay one of the parallel superconducting bits relative to the other one of the parallel superconducting bits by a half-cycle of the clock signal, such that the set of parallel superconducting bits are provided from the respective one of the SIPO cells concurrently.

20. The system of claim 16, further comprising a plurality of delay elements configured to delay each set of the parallel superconducting bits by a different number of clock cycles, such that each of the sets of the parallel superconducting bits are output from the superconducting serial-to-parallel converter system concurrently on a same clock cycle.

* * * * *